(12) United States Patent
Chen et al.

(10) Patent No.: US 9,180,649 B2
(45) Date of Patent: Nov. 10, 2015

(54) FUEL CELLS, CARBON COMPOSITE STRUCTURES AND METHODS FOR MANUFACTURING THE SAME

(75) Inventors: Wan-Shu Chen, Hsinchu (TW);
Tzu-Hsien Han, Hsinchu (TW);
Shu-Hui Cheng, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 247 days.

(21) Appl. No.: 13/547,955

(22) Filed: Jul. 12, 2012

(65) Prior Publication Data

US 2013/0017472 A1 Jan. 17, 2013

(30) Foreign Application Priority Data

Jul. 13, 2011 (TW) .............................. 100124724 A

(51) Int. Cl.
*H01M 8/02* (2006.01)
*B32B 27/04* (2006.01)
*H01M 8/10* (2006.01)

(52) U.S. Cl.
CPC ................ *B32B 27/04* (2013.01); *H01M 8/02* (2013.01); *H01M 8/0234* (2013.01); *H01M 8/0245* (2013.01); *H01M 8/1011* (2013.01); *H01M 2008/1095* (2013.01); *Y02E 60/50* (2013.01); *Y10T 442/10* (2015.04)

(58) Field of Classification Search
None
See application file for complete search history.

(56) References Cited

U.S. PATENT DOCUMENTS

| 7,144,476 | B2 | 12/2006 | Wilde et al. | |
|---|---|---|---|---|
| 7,517,604 | B2 | 4/2009 | Hamrock et al. | |
| 7,608,334 | B2 | 10/2009 | Frisk et al. | |
| 7,785,748 | B2 | 8/2010 | Zhang et al. | |
| 7,790,304 | B2 | 9/2010 | Hendricks et al. | |
| 7,838,138 | B2 | 11/2010 | Larson et al. | |
| 2001/0041283 | A1* | 11/2001 | Hitomi | 429/42 |
| 2003/0224132 | A1 | 12/2003 | Han | |
| 2004/0167014 | A1 | 8/2004 | Yan et al. | |
| 2005/0100498 | A1 | 5/2005 | Nakamura et al. | |
| 2006/0078784 | A1* | 4/2006 | Liu et al. | 429/42 |
| 2006/0222840 | A1 | 10/2006 | Frisk et al. | |

(Continued)

FOREIGN PATENT DOCUMENTS

| CN | 1590287 A | 3/2005 |
|---|---|---|
| CN | 1764752 A | 4/2006 |

(Continued)

OTHER PUBLICATIONS

Chinese Office Action dated Jun. 5, 2014 for Application No. 201110221743.8.

(Continued)

*Primary Examiner* — Patrick Ryan
*Assistant Examiner* — Wyatt McConnell
(74) *Attorney, Agent, or Firm* — Birch, Stewart, Kolasch & Birch, LLP

(57) ABSTRACT

Disclosed is a method to manufacture a carbon composite structure. First, a polymer nano fiber net is provided. The polymer nano fiber net is thermal oxidized to form an oxidized nano fiber net. The oxidized nano fiber net and an oxidized micro fiber net are stacked and impregnated in a resin. The resin is oxidized. Finally, the oxidized nano fiber net, the oxidized micro fiber net, and the oxidized resin are carbonized at a high temperature to form the carbon composite structure.

14 Claims, 2 Drawing Sheets

(56) References Cited

U.S. PATENT DOCUMENTS

| | | |
|---|---|---|
| 2007/0065699 A1 | 3/2007 | Larson et al. |
| 2007/0238010 A1 | 10/2007 | Zhang et al. |
| 2007/0243446 A1 | 10/2007 | Hamrock et al. |
| 2008/0020261 A1 | 1/2008 | Hendricks et al. |
| 2008/0280164 A1 | 11/2008 | Atanasoski et al. |
| 2009/0142647 A1 | 6/2009 | Sugi et al. |
| 2009/0325030 A1 | 12/2009 | Hamrock et al. |
| 2010/0297526 A1 | 11/2010 | Hendricks et al. |
| 2010/0297904 A1 | 11/2010 | Hempelmann et al. |
| 2011/0000615 A1 | 1/2011 | Larson et al. |
| 2011/0200875 A1 | 8/2011 | Miyuki et al. |

FOREIGN PATENT DOCUMENTS

| | | |
|---|---|---|
| CN | 101661839 A | 3/2010 |
| CN | 101817517 A | 9/2010 |
| CN | 101817518 A | 9/2010 |
| CN | 102104159 A | 6/2011 |
| JP | 2007-99551 A | 4/2007 |
| JP | 2008-214824 A | 9/2008 |
| TW | 200937703 A | 2/1997 |
| TW | 201024485 A | 7/2010 |
| TW | I353398- | 1/2011 |
| WO | WO 2006/054636 A1 | 5/2006 |
| WO | WO 2006/069249 A2 | 6/2006 |
| WO | WO 2010/044437 A1 | 4/2010 |

OTHER PUBLICATIONS

Japanese Office Action and English translation thereof dated Jun. 10, 2014 for Application No. 2012-250561.

Luo, "A Study of Mechanical Properties and Microstructure for Structural Carbon/Carbon Composites", Carbon Techniques, Sum107, No. 2, 2000, 4 pages, with abstract.

TW Office Action dated Jul. 30, 2013. 7 pages.

\* cited by examiner

FUEL CELLS, CARBON COMPOSITE STRUCTURES AND METHODS FOR MANUFACTURING THE SAME

CROSS REFERENCE TO RELATED APPLICATIONS

The present application is based on, and claims priority from, Taiwan Application Serial Number 100124724, filed on Jul. 13, 2011, the disclosure of which is hereby incorporated by reference herein in its entirety

TECHNICAL FIELD

The technical field relates to fuel cells, carbon composite structures and methods for manufacturing the same.

BACKGROUND

A fuel cell is composed of a proton conductive film interposed between two catalyst layers, two gas diffusion layers, two bipolar plates, two current collectors, and two end plates. Two sides divided by a proton conductive film of a fuel cell (FC) belong to a anode (for hydrogen, reformatted gas, or methanol) and a cathode (for oxygen or atmosphere air), respectively. An oxidation reaction is performed at the anode, and a chemical reduction reaction is performed at the cathode. When hydrogen (or methanol) contacts a catalyst layer (e.g. platinum or alloys thereof) of the anode, the hydrogen is dissociated to proton and electron. The electron will flow from the anode to the cathode through an electrical bridge (connecting the anode and the cathode). The proton will penetrate through the proton conductive film from the anode to the cathode. Note that the proton conductive film is a wet film, the proton accompanying water molecules can penetrate therethrough, and other air molecules cannot penetrate therethrough. The catalyst of the cathode may combine the oxygen and the electron from the electrical bridge to form an oxygen ion. The oxygen ion will react with the proton penetrating through the proton conductive film to form a water molecule. The above reaction is an electrochemical oxidation and reduction reaction.
A proton exchange membrane fuel cell (PEMFC) or direct methanol fuel cell (DMFC) utilizing an electrochemical reaction may have a high efficiency, no pollution, fast response, and the like. The fuel cells can be series connected to enhance an electrical bridge voltage, and the electrode reaction area of the fuel cells can be increased to increase the current. An inexhaustible supply of oxygen supply (generally atmosphere air) may continuously provide electrical power to a device. As such, the fuel cells may serve as a small-scaled system power or designated as a big power plant, distributed power, or a motive power.

SUMMARY

One embodiment of the disclosure provides a carbon composite structure, comprising: a carbon nano fiber net layer; and a carbon micro fiber net layer on the carbon nano fiber net layer.

One embodiment of the disclosure provides a method for manufacturing a carbon composite structure, comprising: providing an oxidized polymer nano fiber net and an oxidized micro fiber net; stacking the oxidized nano fiber net and the oxidized micro fiber net to form a stacked structure; impregnating the stacked structure in a resin; oxidizing the resin; and carbonizing the oxidized nano fiber net, the oxidized micro fiber net, and the oxidized resin to form a carbon composite structure.

One embodiment of the disclosure provides a fuel cell, comprising a proton conductive film disposed between two end plates. A catalyst layer, a gas diffusion layer, a bipolar plate, and a current collector are sequentially disposed between the proton conductive film and the end plates, wherein the gas diffusion layer comprises a carbon nano fiber net layer and a carbon micro fiber net layer stacked thereon to form a carbon composite structure.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
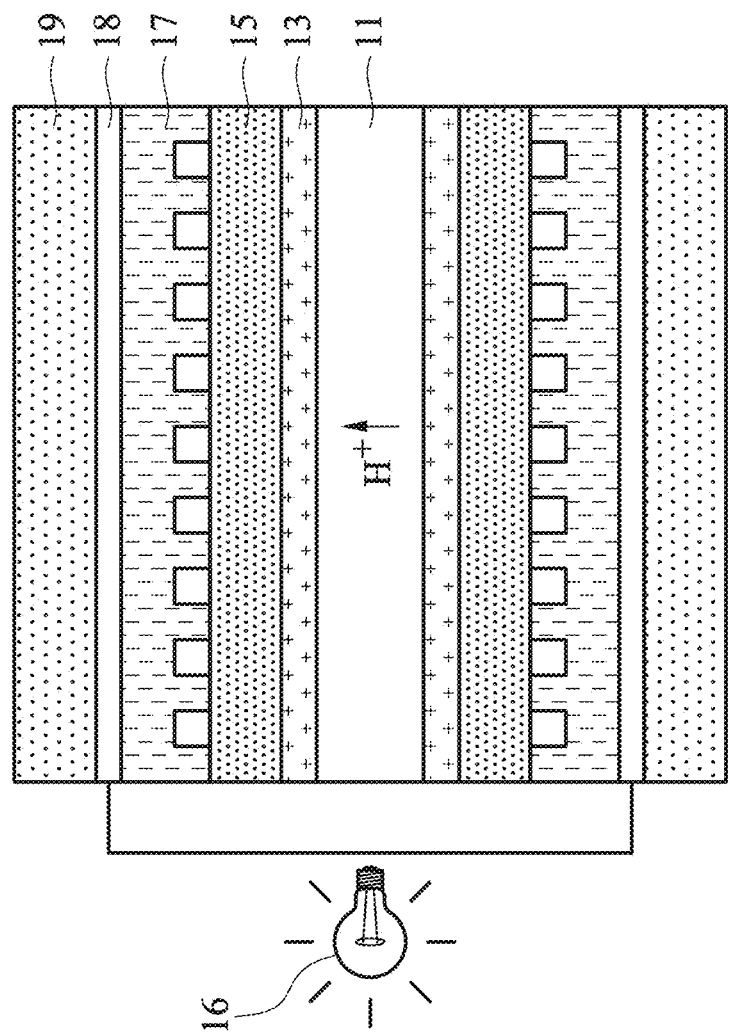
FIG. 1 shows a cross sectional view of a fuel cell in one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The disclosure provides a method of forming a carbon composite structure. First, an oxidized micro fiber net is provided. In one embodiment, a commercially available carbon micro fiber net such as Toray-090 and SGL-35EC is thermally oxidized to form the oxidized micro fiber net. In another embodiment, oxidized carbon micro fibers having a microscaled diameter are needle-punched, paper-made, or woven, to form non-woven cloth, paper, or woven cloth serving as an oxidized micro fiber net. In one embodiment, the oxidized micro fiber net is further thinned by a thermal press.

A polymer such as polyacrylonitrile (PAN), pitch, or phenolic compound is then dissolved in a polar solvent to form a polymer solution. The suitable polar solvent for dissolving the polymer can be N,N-dimethylformamide, N,N-dimethyl ethylamine, dimethyl sulfoxide. The polymer solution has a concentration of about 5 wt % to 30 wt %. The polymer solution is then spun to form a plurality of polymer nano fibers stacked as a net, and the polymer nano fibers have a diameter of about 100 nm to 800 nm. The spinning method can be electrostatic spinning or solution spinning. The electrostatic spinning is performed with a voltage of about 20 kV to 50 kV, and the solution spinning is performed with a nozzle air pressure of about 1 $kg/cm^2$ to 5 $kg/cm^2$. The higher voltage, the higher nozzle air pressure, or the lower concentration of the polymer solution will give the nano fiber a smaller diameter.

The polymer nano fiber net is thermal oxidized to form an oxidized nano fiber net. The oxidized nano fiber net and the oxidized micro fiber net are stacked, and then impregnated in a resin to be adhered. The resin can be phenolic resin, epoxy resin, or combinations thereof. If the impregnation step is omitted, the stack of the oxidized nano fiber net and the oxidized micro fiber net is easily delaminated to reduce the cell performance. In one embodiment, the oxidized nano fiber net and the oxidized micro fiber net are stacked and then impregnated in a phenolic resin. The phenolic resin is then oxidized, and the stack is thermally carbonized at a high temperature under nitrogen. As such, the oxidized nano fiber net, the oxidized micro fiber net, and the oxidized phenolic resin are carbonized to form a carbon composite structure. The thermal source of the carbonization step can be microwave or high-temperature furnace.

In another embodiment, the oxidized nano fiber net can be directly stacked on a commercially available carbon micro fiber net, and then impregnated in a phenolic resin. The phenolic resin is then oxidized, and the oxidized stack is carbonized under nitrogen at a high temperature to form a two-layered carbon composite structure.

The polymer nano fiber net is thermally oxidized at a temperature of about 200° C. to 350° C. for about 1 hour to 4 hours. The phenolic resin is oxidized at a temperature of about 150° C. to 250° C. for about 1 hour to 4 hours. The carbon composite structure is a two-layered stack structure of the carbon nano fiber net and the carbon micro fiber net. In one embodiment, the carbon nano fibers of the carbon nano fiber net layer have a diameter of 100 nm to 800 nm, and pores of the carbon nano fiber net layer have a pore size of about 100 nm to 2.5 µm. The carbon nano fiber net has a thickness of about 10 µm to 100 µm or about 30 µm to 80 µm. Carbon nano fibers with an overly short diameter have difficulty adhering due to their overly large thermal contraction coefficient. Carbon nano fibers with an overly long diameter will make the carbon nano fiber net have overly large pores. Overly small pores of the carbon nano fiber net cannot transfer the methanol. On the other hand, overly large pores cannot block the methanol. An overly thin carbon nano fiber net is easily broken, and an overly thick carbon nano fiber net has overly small pores.

In one embodiment, the carbon micro fibers of the carbon micro fiber net layer have a diameter of about 2 µm to 10 µm or about 2 µm to 8 µm, and pores of the carbon micro fiber net layer have a pore size of about 3 µm to 12 µm. The carbon micro fiber net has a thickness of about 100 µm to 600 µm. The carbon micro fiber net layer has a 3D structure with interlacing carbon fibers, such that the electrically conductive net between the carbon fibers may greatly enhance the electrical conductivity of the carbon micro fiber net layer.

In one embodiment, the carbon nano fiber net and the carbon micro fiber net in a two-layered stack structure have a thickness ratio of about 1~10:10~60 or 2~6:25~35.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

Preparation of a Carbon Micro Fiber Net

Oxidized fibers of PAN having a diameter of 6 µm to 7 µm (commercially available from SHINKONG SYNTHETIC FIBER CORPORATION) were needle-punched to form a non-woven cloth. The non-woven cloth had a thickness of 3 mm and a basis weight of 300 g/m². The non-woven cloth was heated under nitrogen by a heating rate of 10° C./minute to 1500° C., such that the oxidized fibers of the non-woven cloth were carbonized to form a carbon micro fiber net. The carbon micro fiber net had a surface resistance of 299 mΩ/□, a volume resistance of 7 mΩ·cm, an electrical conductivity of 133 S/cm, a pressure durability of 100 kg/cm², and a pore size distribution of 3 µm to 12 µm.

Example 2

Preparation of a Carbon Micro Fiber Net

Oxidized fibers of PAN having a diameter of 6 µm to 7 µm (commercially available from SHINKONG SYNTHETIC FIBER CORPORATION) were needle-punched to form a non-woven cloth. The non-woven cloth had a thickness of 3 mm and a basis weight of 300 g/m². The non-woven cloth was thinned via thermal press to be a denser non-woven cloth with a thickness of 1.5 mm. The thinned non-woven cloth was heated under nitrogen by a heating rate of 10° C./minute to 1500° C., such that the oxidized fibers of the thinned non-woven cloth were carbonized to form a carbon micro fiber net. The carbon micro fiber net had a surface resistance of 246 mΩ/□, a volume resistance of 6 mΩ·cm, an electrical conductivity of 162 S/cm, a pressure durability of 100 kg/cm², and a pore size distribution of 3 µm to 10 µm. The carbon micro fiber net had a thickness of about 300±10 µm.

Example 3

Preparation of a Carbon Nano Fiber Net 13 g of polyacrylonitrile (commercially available from Tong-Hwa Synthetic Fiber Co., Ltd.) was dissolved in 87 g of dimethylacetamide (DMAc) to form a polyacrylonitrile solution. The polyacrylonitrile solution was spun by electrostatic spinning by a voltage of 39.5 kV to form a polymer nano fiber net, wherein polymer nano fibers thereof had a diameter of 200 nm to 700 nm. The polymer nano fiber net was oxidized under oxygen by a temperature of 280° C. for 180 minutes to obtain an oxidized nano fiber net. The oxidized nano fiber net was carbonized under nitrogen by a heating rate of 10° C./minute to 1500° C., such that the oxidized nano fibers were carbonized to form a carbon nano fiber net. The carbon nano fiber net had a thickness of 38 µm to 44 µm, a surface resistance of 9 Ω/cm², a volume resistance of 0.05 Ω·cm, an electrical conductivity of 13 S/cm, a pressure durability of 10 kg/cm², and a pore size distribution of 1 µm to 2 µm. The carbon nano fiber net in Example 3 had a dramatically lower volume resistance, a lower mechanical strength, and a lower pressure durability than that of the thinned carbon micro fiber net in Example 2.

Example 4

Preparation of a Composite Structure of a Carbon Nano Fiber Net and a Carbon Micro Fiber Net Oxidized fibers of PAN having a diameter of 6 µm to 7 µm (commercially available from Shinkong Synthetic Fiber Corporation) were needle-punched to form a non-woven cloth. The non-woven cloth had a thickness of 3 mm and a basis weight of 300 g/m². The non-woven cloth was thinned via thermal press to be a denser non-woven cloth with a thickness of 1.5 mm.

13 g of polyacrylonitrile (commercially available from Tong-Hwa Synthetic Fiber Co., Ltd.) was dissolved in 87 g of dimethylacetamide (DMAc) to form a polyacrylonitrile solution. The polyacrylonitrile solution was spun by electrostatic spinning by a voltage of 39.5 kV to form a polymer nano fiber net, wherein polymer nano fibers thereof had a diameter of 200 nm to 700 nm. The polymer nano fiber net was oxidized under oxygen by a temperature of 270° C. for 180 minutes to obtain an oxidized nano fiber net. The oxidized nano fiber net had a thickness of 59 μm to 64 μm.

Figure 2:
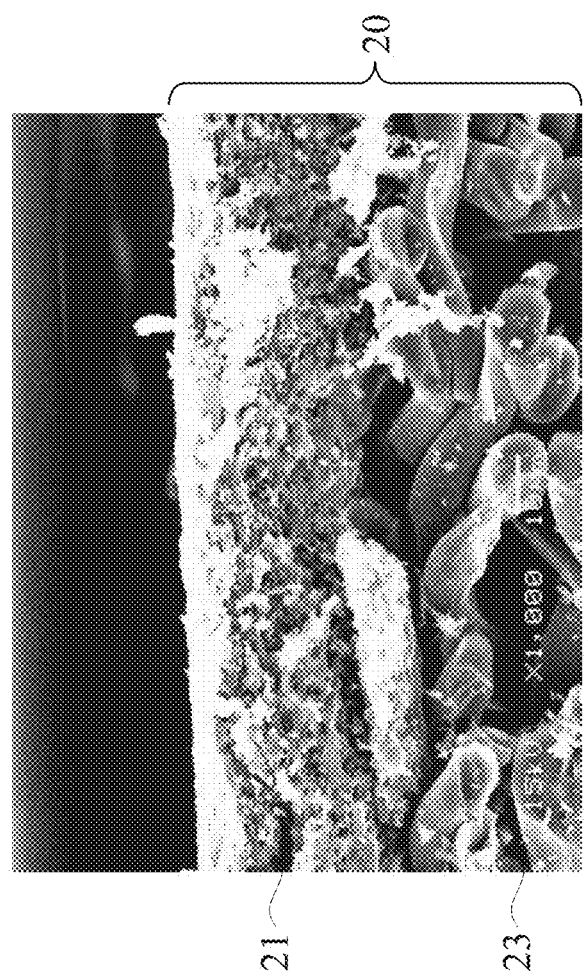
FIG. 2 shows a cross sectional SEM photograph of a carbon composite structure in one embodiment of the disclosure.

The oxidized nano fiber net and the thinned non-woven cloth were stacked, and then impregnated in a phenolic resin. The stack structure was heated under oxygen at a temperature of 200° C. to oxidize the phenolic resin. The oxidized stack structure was heated under nitrogen by a heating rate of 10° C./minute to 1500° C., thereby carbonizing the oxidized nano fiber net, the non-woven cloth, and the oxidized phenolic resin to form a carbon composite structure. The carbon nano fiber net had a thickness of 38 μm to 44 μm, and the carbon micro fiber net had a thickness of about 300±10 μm. The carbon composite structure had a surface resistance of 213 mΩ/cm$^2$, a volume resistance of 5 mΩ·cm, an electrical conductivity of 190 S/cm, a pressure durability of 100 kg/cm$^2$, and a pore size distribution of 1 μm to 1.5 μm. As shown in a cross sectional SEM photograph in FIG. 2, the carbon nano fiber net 21 and the carbon micro fiber net 23 were stacked to form the carbon composite structure 20.

The two-layered carbon composite structure in Example 4 had a higher conductivity than that of the single-layered carbon nano fiber net in Example 3 or the single-layered carbon micro fiber net in Example 2. The two-layered carbon composite structure in Example 4 had a lower pore size distribution than that of the single-layered carbon nano fiber net in Example 3.

Example 5

Fuel Cell Test

The samples in Examples 1 to 4 were cut to a size of 5 cm×5 cm, and then assembled with a catalyst coated membrane (CCM, E71913 commercially available from Dupont) to form a three-layered membrane electrode assembly (MEA). The assemblies were sealed in a fuel cell test module. After air tightness thereof was confirmed by a Teflon gasket, the fuel cell was tested.

The anode fuel (1M methanol) had a flow rate of 1.83 stpm, and the cathode gas ($O_2$) had a flow rate of 300 cc/min. The testing temperature was set at 60° C. The fuel cell was loaded 0.4V to measure its current density and methanol-blocking ability. The fuel cell with the sample in Example 1 had a current density of 55 mA/cm$^2$ and a methanol-blocking ability of 0.577V. The fuel cell with the sample in Example 2 had a current density of 57 mA/cm$^2$ and a methanol-blocking ability of 0.584V. The fuel cell with the sample in Example 3 had insufficient pressure durability and therefore failed to be measured. The fuel cell with the sample in Example 4 had a current density of 60 mA/cm$^2$ and a methanol-blocking ability of 0.594V. Accordingly, the fuel cell with the carbon composite structure in Example 4 had a higher current density and a higher methanol blocking ability than that of the fuel cells with the single layered carbon nano fiber net or the carbon micro fiber net in Examples 1-3.

In one embodiment, carbon composite structure may serve as the gas diffusion layer 15 of the fuel cell as shown in FIG. 1. In FIG. 1, the proton conductive film 11 is interposed between two catalyst layers 13, two gas diffusion layers 15, two bipolar plates 17, two current collectors 18, and two end plates 19.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A carbon composite structure, comprising:
   a carbon nano fiber net layer; and
   a carbon micro fiber net layer on the carbon nano fiber net layer,
   wherein pores of the carbon nano fiber net layer have a pore size distribution of 1 μm to 2 μm.

2. The carbon composite structure as claimed in claim 1, wherein carbon nano fibers of the carbon nano fiber net layer have a diameter of 100 nm to 800 nm.

3. The carbon composite structure as claimed in claim 1, wherein the carbon nano fiber net layer has a thickness of 10 μm to 100 μm.

4. The carbon composite structure as claimed in claim 1, wherein carbon micro fibers of the carbon micro fiber net layer have a diameter of 2 μm to 10 μm, and pores of the carbon micro fiber net layer have a pore size of 3 μm to 12 μm.

5. The carbon composite structure as claimed in claim 1, wherein the carbon micro fiber net layer has a thickness of 100 μm to 600 μm.

6. A method for manufacturing a carbon composite structure, comprising:
   providing an oxidized polymer nano fiber net and an oxidized micro fiber net;
   stacking the oxidized nano fiber net and the oxidized micro fiber net to form a stacked structure;
   impregnating the stacked structure in a resin;
   oxidizing the resin; and
   carbonizing the oxidized nano fiber net, the oxidized micro fiber net, and the oxidized resin to form a carbon composite structure comprising:
   a carbon nano fiber net layer; and
   a carbon micro fiber net layer on the carbon nano fiber net layer,
   wherein pores of the carbon nano fiber net layer have a pore size distribution of 1 μm to 2 82 m.

7. The method as claimed in claim 6, wherein the resin comprises phenolic resin, epoxy resin, or combinations thereof.

8. The method as claimed in claim 6, wherein the step of providing the polymer nano fiber net comprises:
   providing a polymer solution; and
   spinning the polymer solution to form a plurality of polymer nano fibers, wherein the polymer nano fibers are stacked to form the polymer nano fiber net.

9. The method as claimed in claim 8, wherein the polymer solution comprises polyacrylonitrile, pitch, or phenolic compound dissolved in a polar solvent.

10. A fuel cell, comprising:
    a proton conductive film disposed between two end plates; and
    a catalyst layer, a gas diffusion layer, a bipolar plate, and a current collector are sequentially disposed between the proton conductive film and the end plates, respectively,
    wherein the gas diffusion layer comprises a carbon nano fiber net layer and a carbon micro fiber net layer thereon to form a carbon composite structure,
    wherein pores of the carbon nano fiber net layer have a pore size distribution of 1 μm 2 μm.

11. The fuel cell as claimed in claim 10, wherein the carbon nano fibers of the carbon nano fiber net layer have a diameter of 100 nm to 800 nm.

12. The fuel cell as claimed in claim 10, wherein the carbon micro fibers of the carbon micro fiber net layer have a diameter of 2 μm to 10 μm, and pores of the carbon micro fiber net layer have a pore size of 3 μm to 12 μm.

13. The fuel cell as claimed in claim 6, wherein the carbon nano fiber net layer and the carbon micro fiber net layer have a thickness ratio of 1~10:10~60.

14. The carbon composite structure as claimed in claim 1, wherein the carbon micro fibers of the carbon micro fiber net layer have a diameter of 2 μm to 8 μm, has a thickness of 100 μm to 600 μm, and pores of the carbon micro fiber net layer have a pore size of 3 μm to 12 μm, wherein the carbon nano fibers of the carbon nano fiber net layer have a diameter of 100 nm to 800 nm, and have a thickness of about 30 μm to 80 μm, and wherein the carbon micro fiber net layer has a 3D structure with interlacing carbon fibers.

\* \* \* \* \*